United States Patent
Biller et al.

(10) Patent No.: US 11,441,710 B2
(45) Date of Patent: Sep. 13, 2022

(54) SEAL CLAMP ASSEMBLY

(71) Applicant: EGC Operating Company LLC, Chardon, OH (US)

(72) Inventors: Brian Biller, Mentor, OH (US); Michael Bartos, Painesville, OH (US); Jeffrey Edwards, Willoughby, OH (US)

(73) Assignee: EGC ENTERPRISES, INC., Chardon, OH (US)

( * ) Notice: Subject to any disclaimer, the term of this patent is extended or adjusted under 35 U.S.C. 154(b) by 159 days.

(21) Appl. No.: 16/923,744

(22) Filed: Jul. 8, 2020

(65) Prior Publication Data

US 2022/0010899 A1 Jan. 13, 2022

(51) Int. Cl.
*F16L 21/00* (2006.01)
*F16L 25/14* (2006.01)

(52) U.S. Cl.
CPC ............ *F16L 25/14* (2013.01); *F16L 21/005* (2013.01)

(58) Field of Classification Search
CPC . F16L 23/04; F16L 17/04; F16L 21/02; F16L 21/06; F16L 25/14; F16L 27/1017; F16L 27/113; F16L 27/1133; F16L 27/107; F16L 21/005; F16L 47/12
USPC .......... 285/407, 62, 420, 421, 403, 373, 337
See application file for complete search history.

(56) References Cited

U.S. PATENT DOCUMENTS

| | | | | |
|---|---|---|---|---|
| 1,974,813 | A * | 9/1934 | Grawoig | F16L 25/14 |
| 2,448,769 | A * | 9/1948 | Chamberlain | F16L 27/1133 |
| 3,104,898 | A * | 9/1963 | MacDonald | F16L 21/005 |
| 4,101,151 | A * | 7/1978 | Ferguson | F16L 21/005 |
| | | | | 285/373 |
| 4,172,607 | A * | 10/1979 | Norton | F16L 21/005 |
| | | | | 285/373 |
| 4,186,948 | A * | 2/1980 | Cronk | F16L 25/14 |
| | | | | 285/373 |
| 4,380,348 | A * | 4/1983 | Swartz | F16L 25/14 |
| | | | | 285/373 |
| 4,480,860 | A * | 11/1984 | Foresta | F16L 25/14 |
| 5,039,137 | A * | 8/1991 | Cankovic | F16L 25/14 |
| 5,410,781 | A * | 5/1995 | Anjos | |
| 7,735,875 | B2 * | 6/2010 | Jimenez | 285/373 |
| 8,651,532 | B2 * | 2/2014 | Felber | F16L 21/005 |
| 2003/0015872 | A1 * | 1/2003 | Potts | F16L 21/005 |
| | | | | 285/420 |
| 2016/0178098 | A1 * | 6/2016 | Felber | F16L 21/005 |

* cited by examiner

*Primary Examiner* — Zachary T Dragicevich
*Assistant Examiner* — William S. Choi
(74) *Attorney, Agent, or Firm* — Tucker Ellis, LLP

(57) ABSTRACT

A seal clamp assembly for sealing a female and male member together may include a seal configured to be positioned over the female and male members, the seal having a first end, a second end opposite the first end, a first edge, and a second edge opposite the first edge, and a retainer configured to be positioned over the seal, the retainer having a first end, a second end opposite the first end, a first edge, and a second edge opposite the first edge, wherein the retainer has a serpentine configuration along its length.

18 Claims, 7 Drawing Sheets

SEAL CLAMP ASSEMBLY

TECHNICAL FIELD

In general, the present invention relates to clamp assembly, and in particular to a clamp assembly for a sealing two components together.

BACKGROUND OF THE INVENTION

A manifold for a vehicle, such as an exhaust manifold for an engine, can be subjected to variations in temperature and mechanical vibration. Sealing assemblies may be provided between parts of the manifold to seal the parts to one another to accommodate for the temperature variations and vibration.

SUMMARY OF THE INVENTION

In accordance with an embodiment of the present invention, a seal clamp assembly configured to seal female and male members together is provided. The seal clamp assembly includes a seal configured to be positioned over the female and male members, the seal having a first end, a second end opposite the first end, a first edge, and a second edge opposite the first edge, and a retainer configured to be positioned over the seal, the retainer having a first end, a second end opposite the first end, a first edge, and a second edge opposite the first edge, wherein the retainer has a serpentine configuration along its length.

In an embodiment, the seal has an area with a first thickness along its length at the first edge and an area with a second thickness along its length at the second edge greater than the first thickness.

In an embodiment, the second area of the seal is configured to abut the male member, the first area of the seal is configured to abut the female member, and a transition area between the first and second areas is configured to abut an end face of the female member.

In an embodiment, the retainer includes upwardly extending projections projecting upward from the first and second edges for axially retaining clamps.

In an embodiment, the retainer includes downwardly extending legs projecting downward from the first and second edges for axially retaining the seal.

In an embodiment, the retainer includes upwardly extending projections projecting upward from the first and second edges for axially retaining clamps and downwardly extending legs projecting downward from the first and second edges for axially retaining the seal.

In an embodiment, the retainer includes a body having a plurality of horizontal portions longitudinally spaced from one another, the horizontal portions being connected to an adjacent one of the plurality of horizontal portions at one side thereof by one of a plurality of vertical portions.

In an embodiment, gaps are formed between the horizontal portions that alternately open to the first and second edges along the length of the retainer.

In an embodiment, the assembly further includes at least one clamp configured to be positioned over the retainer.

In an embodiment, the at least one clamp includes first and second clamps positioned over the retainer.

In accordance with another embodiment of the present invention, a seal clamp assembly is provided that includes a seal having a first end, a second end opposite the first end, a first edge, and a second edge opposite the first edge, and a retainer configured to be positioned over the seal, the retainer having a first end, a second end opposite the first end, a first edge, and a second edge opposite the first edge, and the retainer including a plurality of horizontal portions longitudinally spaced from one another and being connected to an adjacent one of the plurality of horizontal portions at one side thereof by one of a plurality of vertical portions.

In an embodiment, the plurality of horizontal portions includes a first horizontal portion at the first end, a second horizontal portion at the second end, and a plurality of middle horizontal portions extending therebetween, and wherein each middle horizontal portion is connected on one side thereof to one of the plurality of vertical portions that extends away from the middle horizontal portion in a first longitudinal direction towards the first end and on another side thereof to one of the plurality of vertical portions that extends away from the middle horizontal portion in a second longitudinal direction towards the second end.

In an embodiment, gaps are formed between the middle horizontal portions that alternately open to the first and second edges along a length of the retainer.

In an embodiment, the seal has an area with a first thickness along its length at the first edge and an area with a second thickness along its length at the second edge greater than the first thickness.

In an embodiment, the second area of the seal is configured to abut a male member, the first area of the seal is configured to abut a female member, and a transition area between the first and second areas is configured to abut an end face of the female member.

In an embodiment, the retainer includes upwardly extending projections projecting upward from the first and second edges for axially retaining clamps.

In an embodiment, the retainer includes downwardly extending legs projecting downward from the first and second edges for axially retaining the seal.

In accordance with another embodiment of the present invention, a seal clamp assembly configured to seal female and male members together is provided. The seal clamp assembly includes a seal configured to be positioned over the female and male members, the seal having a first end, a second end opposite the first end, a first edge, and a second edge opposite the first edge, and wherein the seal has an area with a first thickness along its length at the first edge and an area with a second thickness along its length at the second edge greater than the first thickness, and a retainer configured to be positioned over the seal, the retainer having a first end, a second end opposite the first end, a first edge, and a second edge opposite the first edge, and the retainer including a plurality of horizontal portions longitudinally spaced from one another and being connected to an adjacent one of the plurality of horizontal portions at one side thereof by one of a plurality of vertical portions, wherein the plurality of horizontal portions includes a first horizontal portion at the first end, a second horizontal portion at the second end, and a plurality of middle horizontal portions extending therebetween, and wherein each middle horizontal portion is connected on one side thereof to one of the plurality of vertical portions that extends away from the middle horizontal portion in a first longitudinal direction towards the first end and on another side thereof to one of the plurality of vertical portions that extends away from the middle horizontal portion in a second longitudinal direction towards the second end.

In an embodiment, wherein the second area of the seal is configured to abut the male member, the first area of the seal is configured to abut the female member, and a transition area between the first and second areas is configured to abut an end face of the female member.

In an embodiment, wherein the retainer includes upwardly extending projections projecting upward from the first and second edges for axially retaining clamps and downwardly extending legs projecting downward from the first and second edges for axially retaining the seal.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
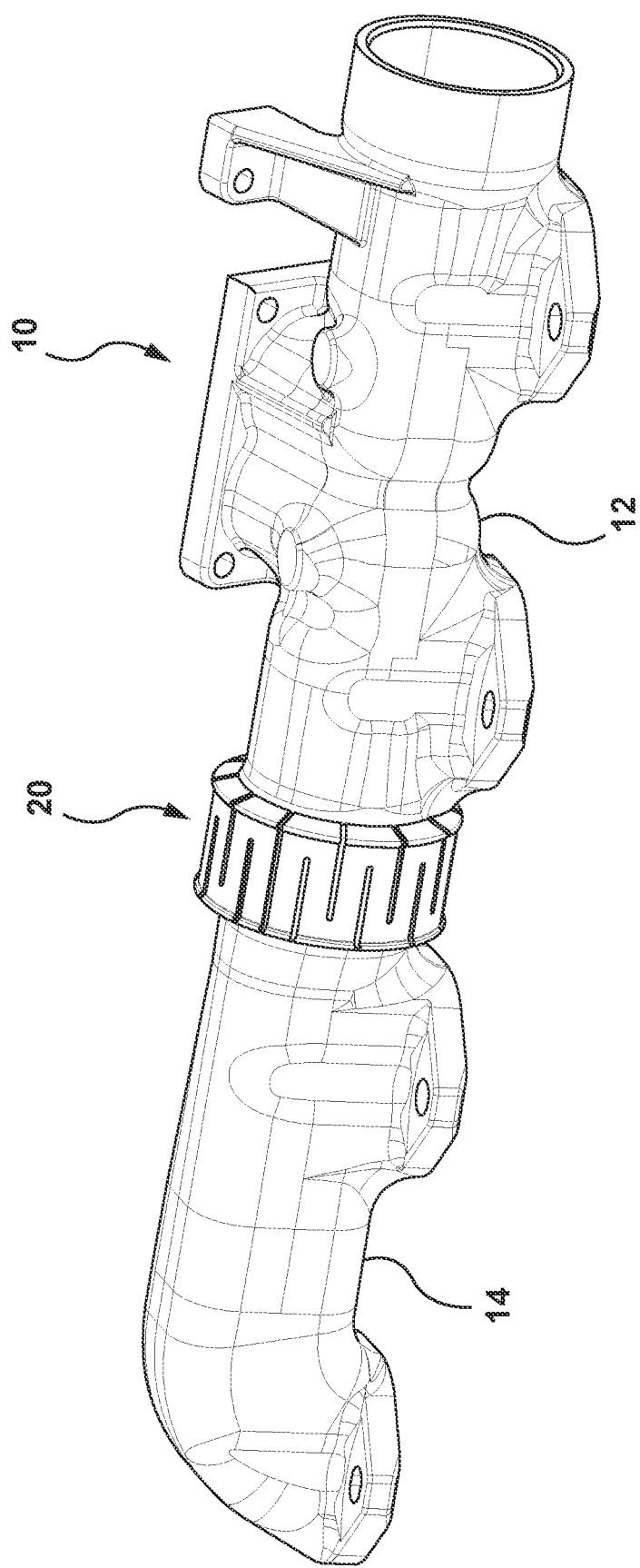
FIG. 1 is a perspective view of a manifold assembly with an exemplary seal clamp assembly.

Embodiments of the invention relate to methods and systems that relate to a seal clamp assembly configured to seal female and male members together. The seal clamp assembly includes a seal configured to be positioned over the female and male members, the seal having a first end, a second end opposite the first end, a first edge, and a second edge opposite the first edge, and a retainer configured to be positioned over the seal, the retainer having a first end, a second end opposite the first end, a first edge, and a second edge opposite the first edge, wherein the retainer has a serpentine configuration along its length.

The principles of the present application relate to a seal clamp assembly for sealing components together, such as male and female slip joints between components that route engine exhaust. In an embodiment, the seal clamp assembly may be used with an exhaust manifold for a vehicle, and will be described below in this context. It will be appreciated that the principles of the application may be applicable to a clamp assembly for sealing any two suitable components.

With reference to the drawings, like reference numerals designate identical or corresponding parts throughout the several views. However, the inclusion of like elements in different views does not mean a given embodiment necessarily includes such elements or that all embodiments of the invention include such elements. The examples and figures are illustrative only and not meant to limit the invention, which is measured by the scope and spirit of the claims.

Figure 2:
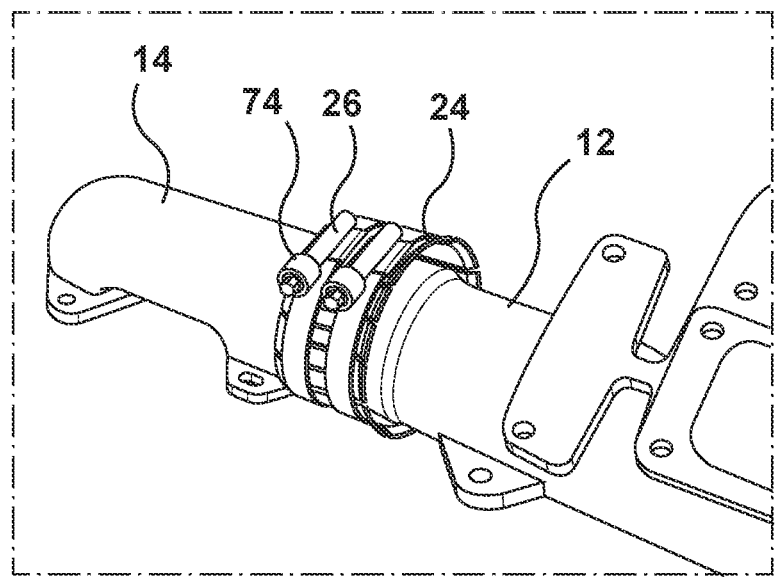
FIG. 2 is another perspective view of the manifold assembly with the seal clamp assembly.
Figure 3:
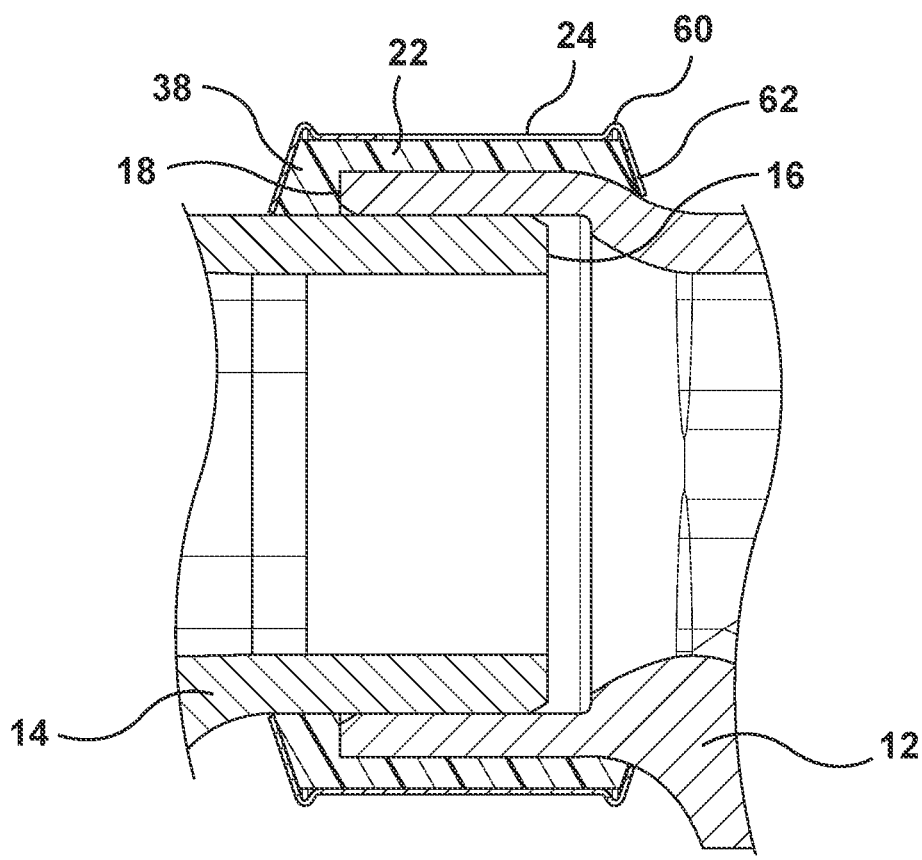
FIG. 3 is a partial cross-sectional view of FIG. 1.
Figure 4:
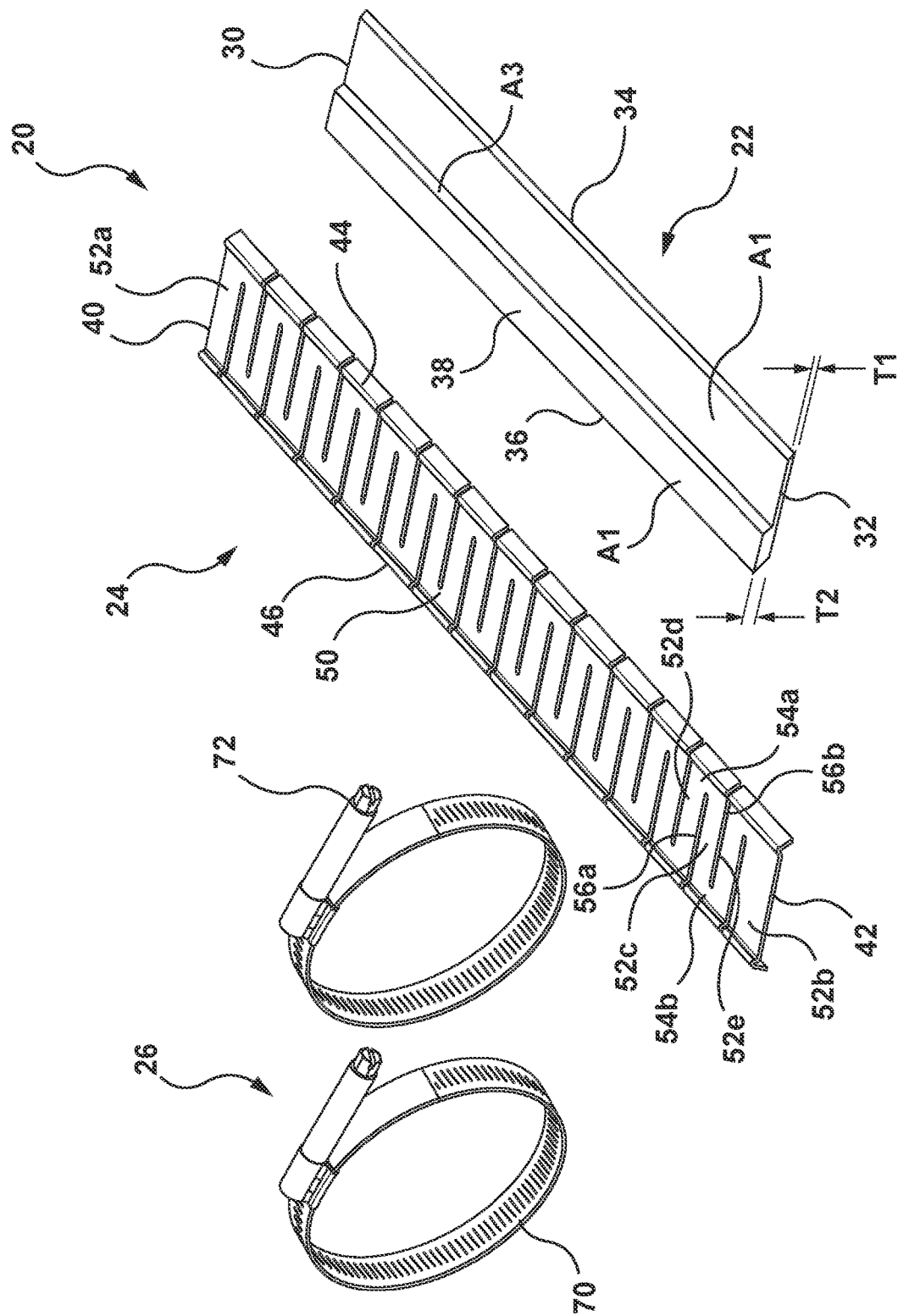
FIG. 4 is an exploded view of the seal clamp assembly.
Figure 5:
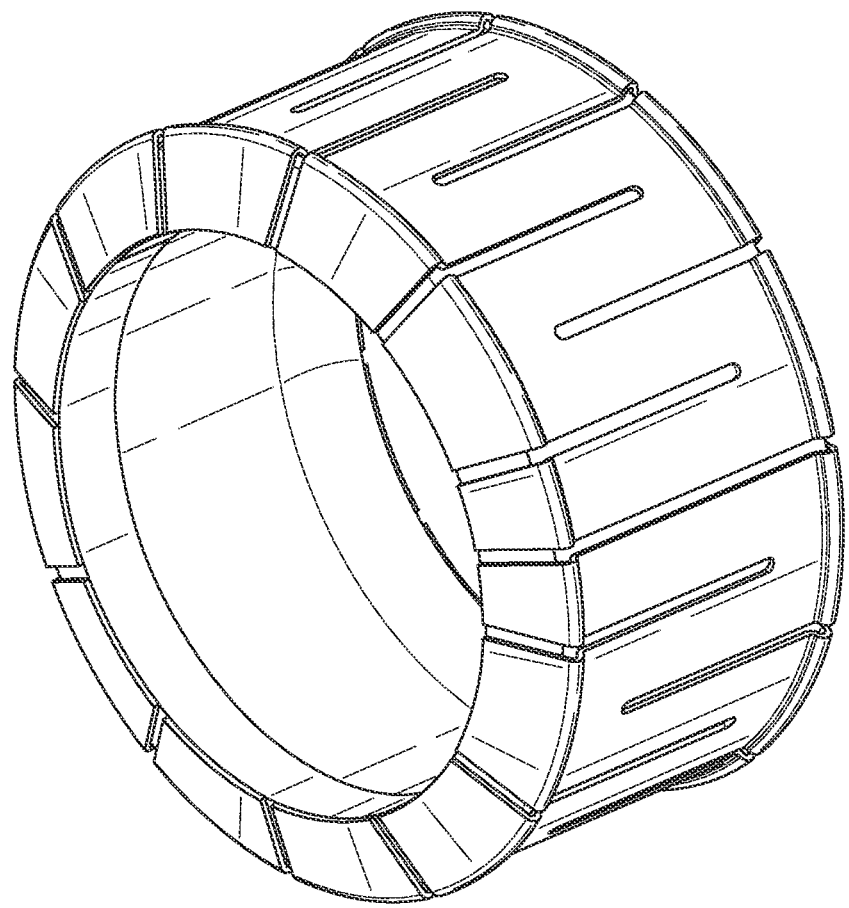
FIG. 5 is a perspective view of a seal and retainer of the seal clamp assembly in an installed configuration.
Figure 6:
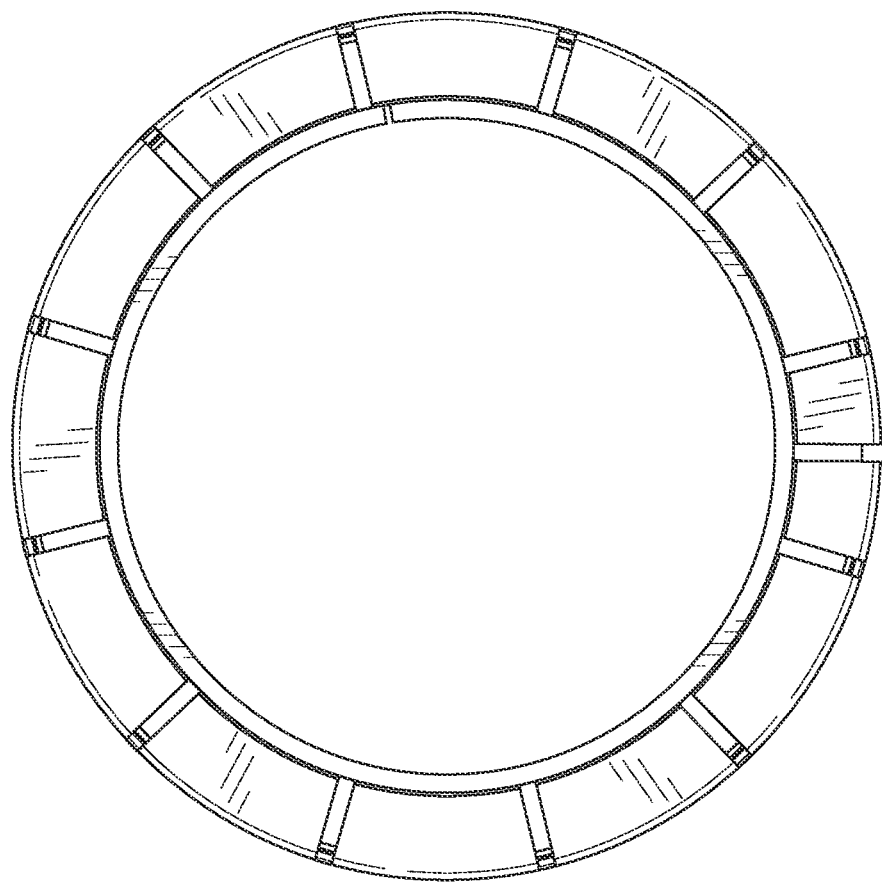
FIG. 6 is a front view of the seal and retainer.
Figure 7:
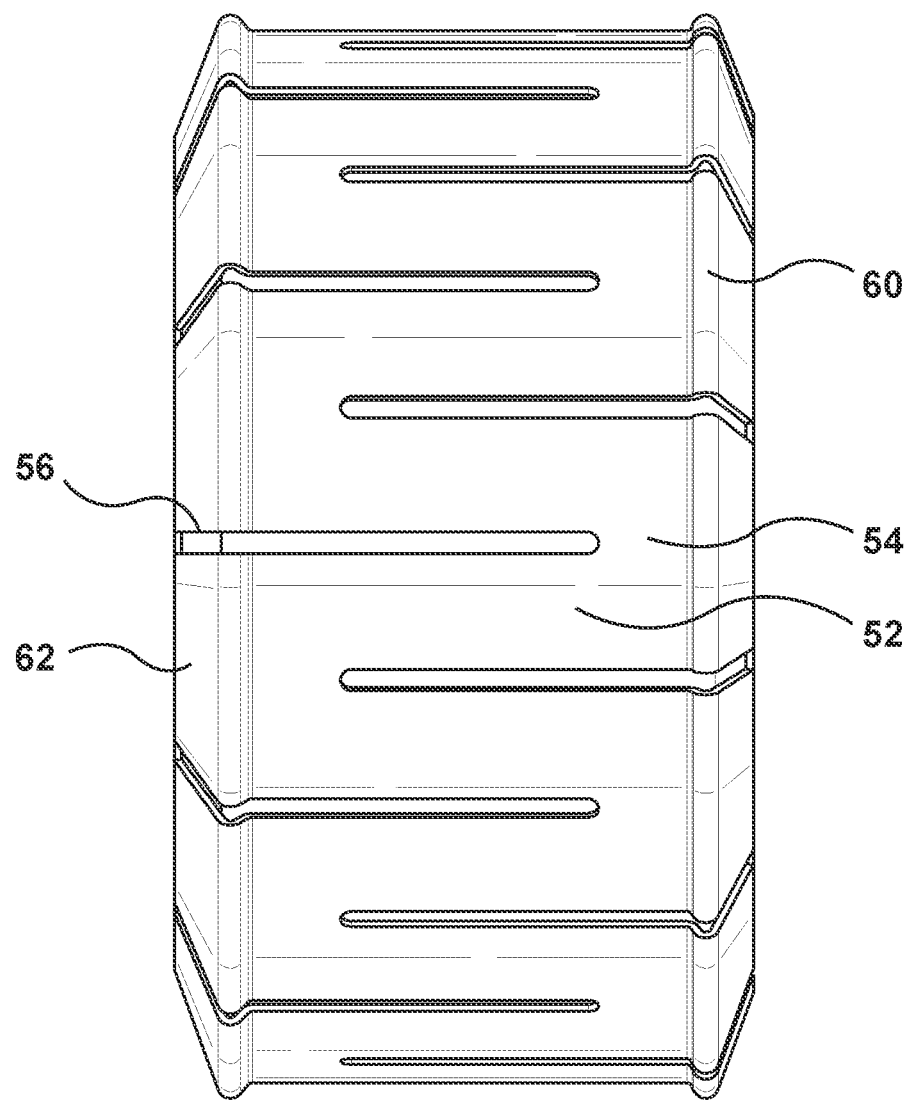
FIG. 7 is an end view of the seal and retainer in an installed configuration.
Figure 8:
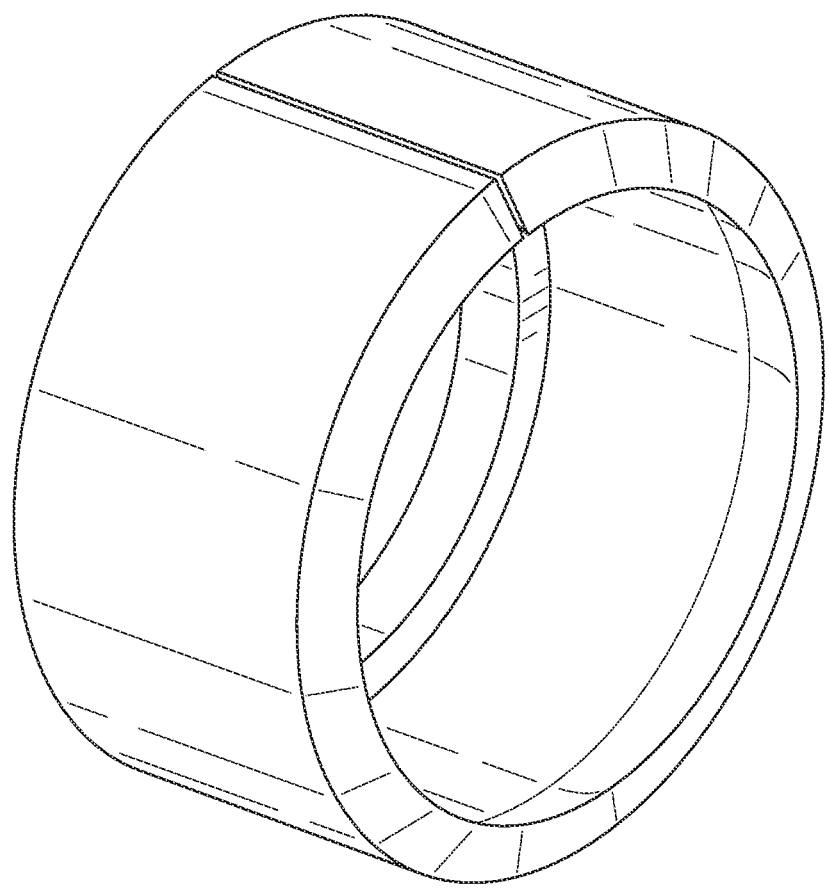
FIG. 8 is a perspective view of the seal in the installed configuration.

Turning initially to FIGS. 1-3, a manifold assembly, such as an exhaust manifold assembly for a vehicle, is illustrated as reference numeral 10. The manifold assembly 10 includes a female manifold member 12 and a male manifold member 14. The male manifold member 14 has an end 16 that is received in the female manifold member 12 at an end 18. The end 18 may be enlarged and include a counterbore to receive the end 16 of the male manifold member 14 as shown in FIG. 3. The female and male manifold members 12 and 14 may be any suitable size and include any suitable number of openings and ports. To seal the female manifold member 12 and male manifold member 14 to one another at the end 18 of the female manifold member 12, a seal clamp assembly 20 is provided. The seal clamp assembly 20 includes a seal 22 configured to abut the female manifold member 12 and the male manifold member 14, a retainer 24 configured to be positioned over the seal 22 to hold the seal 22 in position, and one or more clamps 26 configured to be positioned over the retainer 24 for tightening the seal 22 and retainer 24.

Turning additionally to FIGS. 4-8, the seal 22 may be a flexible and compressible seal suitable for sealing the manifold assembly 10 at exhaust temperatures, such as a seal made at least partially of ceramic fiber, mineral fiber, mica, vermiculite, a combination thereof, such as a ceramic and vermiculite composite, or a flexible graphite based seal. The seal 22 has a first end 30, a second end 32 opposite the first end 30, a first edge 34, and a second edge 36 opposite the first edge 34. The seal 22 can be sized to have a length extending between the first and second ends 30 and 32 that is equal to or substantially equal to a circumference of the female manifold member 12 to allow the seal 22 to be wrapped around the female manifold member 12 and the male manifold member 14. The seal 22 can also be sized to have at least two thicknesses for sealing to both the female and male manifold members 12 and 14. The seal 22 can include an area A1 with a first thickness T1 along its length extending from the first edge 34 toward the second edge 36, and an area A2 with a second thickness T2 along its length at the second edge 36 greater than the first thickness T1. The area A2 with the second thickness T2 forms an upwardly projecting portion 38 for sealing against the male manifold member 14. When placed over the female and male manifold members 12 and 14, the second area A2 of the seal 22 will be placed over the male manifold member 14 such that a transition area A3 between the first and second areas A1 and A2 of the seal 22 abuts an end face of the female manifold member 12 at the end 18 at the area of the overlap between the female and male manifold members 12 and 14 as shown in FIG. 3. In an embodiment, the seal can be sized to have more than two thicknesses defining areas for abutting various faces of a joint.

Referring now to the retainer 24 in detail, the retainer may be made of a suitable material, such as a suitable metal, such as stainless steel. The retainer 24 has a first end 40, a second end 42 opposite the first end 40, a first edge 44, and a second edge 46 opposite the first edge 44. The retainer 24 can be sized to have a length extending between the first and second ends 40 and 42 that is equal to greater than the circumference of the female manifold member 12. The retainer 24 is designed such that the first and second ends 40 and 42 can be overlapped to allow the retainer 24 to be used with varying sizes of manifolds and to allow the retainer to be further tightened at a later date, for example if the seal 22 has lost mass. The retainer 24 may be a flexible retainer having a suitable configuration to allow for uniform loading to be applied to the seal 22 to apply even pressure across all areas of the seal 22. As shown, the retainer 24 has a serpentine configuration extending from the first end 40 to the second end 42. It will be appreciated that the retainer 24 may have other suitable configurations that allow for uniform loading of the seal and for tightening of the retainer 24 during use.

The retainer 24 includes a body 50 having the serpentine configuration. The body 50 has a plurality of horizontal portions 52 extending between the first and second edges 44 and 46 that are longitudinally spaced from one another along the length of the retainer 24 and connected to an adjacent one of the plurality of horizontal portions 52 at one side thereof by one of a plurality of vertical portions 54 in a serpentine configuration. The horizontal portions 52 can include a horizontal portion 52a at the first end 40 and a horizontal portion 52b at the second end 42 that has a length that is greater than a length of the horizontal portion 52a at the first end 40. Each of the horizontal portions 52 between the horizontal portions 52a and 52b, sometimes referred to as middle horizontal portions, is connected at one end to one of the plurality of vertical portions 54 extending away from the respective middle horizontal portion 52 in a first longitudinal direction toward the first end 40 and is connected at another end to one of the plurality of vertical portion 54 extending away from the respective middle horizontal portion 52 in a second longitudinal direction toward the second end 42. The plurality of vertical portions 54 space the horizontal portions 52 from one another forming gaps 56 that open from an inner edge of the vertical portion 54 to the opposite first or second edges 44 and 46. The vertical portions 54 alternate with one another along the length of the retainer 24 to form with the horizontal portions 52 the serpentine configuration. The gaps are capable of opening and closing as the joint is heated and cooled and when the seal is loaded, allowing the seal to be loaded evenly around its circumference.

For example, a horizontal portion 52c is connected at one end to a vertical portion 54a that extends along the first edge 44 in the first longitudinal direction toward the first end 40, and the horizontal portion 52c is connected at the other end to a vertical portion 54b that extends along the second edge 46 in the second longitudinal direction toward the second end 42. The vertical portion 54a connects the horizontal portion 52c to a horizontal portion 52d adjacent one side of the horizontal portion 52c, and the vertical portion 54b connects the horizontal portion 52c to a horizontal portion 52e adjacent the other side of the horizontal portion 52c. A gap 56a is defined between the horizontal portion 52c and the horizontal portion 52d that opens to the second edge 46, and a gap 56b is defined between the horizontal portion 52c and the horizontal portion 52e that opens to the first edge 44, thereby providing alternately opening gaps.

The retainer 24 also includes upwardly extending projections 60 projecting upward from each side of the body 50 along the first and second edges 44 and 46 and downwardly extending legs 62 projecting downward from each side of the body 50 along the first and second edges 44 and 46. The upwardly extending projections 60 provide for axial containment of the clamps 26 when the clamps 26 are installed over the body 50. The downwardly extending legs 62 provide for axial containment of the seal 22 when the retainer 24 is installed over the seal 22. As shown, the downwardly extending legs 62 project downward and outwardly from the upwardly extending projections 60.

Referring again to FIGS. 2 and 4, the clamps 26 may be suitable clamps for securing the retainer 24 around the manifold assembly 10, such as suitable spring-loaded or live loaded clamps, such as spring-loaded worm gear or T-bold clamps, and may be made of a suitable material, such as a suitable metal, such as stainless steel. The spring-loaded or live loaded clamps maintain even loading on the seal 22 as it expands and contracts through thermal cycles and compensates for a loss in seal mass without compromising functionality. The clamps 26 may have a body 70 that surround the retainer 24, a tightening mechanism 72 that can be tightened by a suitable tool to tighten the body 70, and a spring assembly 74 including a suitable spring, such as a helical spring or a Belleville spring, for maintaining even loading on the seal 22. One of the clamps 26 is configured to be positioned over the retainer 24 along the first edge 44, and the other of the clamps 26 is configured to be positioned over the retainer 24 along the second edge 46 to hold the seal against the area of the overlap between the female and male manifold members 12 and 14. It will be appreciated that other suitable clamps may be used, such as a standard worm gear clamp.

To attach the seal clamp assembly 20 to the manifold assembly 10, the second end 42 of the retainer 24 is positioned under the manifold assembly 10 with the upwardly extending projections 60 facing downward and the downwardly extending legs 62 facing upward. The seal 22 is positioned on the retainer 24 with the upwardly projecting portion 38 with the second thickness T2 facing upward underneath the male manifold member 14 and the area A1 of the seal with the first thickness T1 being positioned underneath the female manifold member 12. The retainer 24 and seal 22 are then wrapped around the female and male manifold members 12 and 14 so that the upwardly projecting portion 38 of the seal 22 contacts the male manifold member 14 and abuts an end face at the end 18 of the female manifold member 12 at the area of overlap, and the area A1 of the seal contacts the female manifold member 12.

Due to the retainer 24 having a length greater than the circumference of the female manifold member 12, the first and second ends 40 and 42 of the retainer 24 are overlapped, ensuring the first and second ends 40 and 42 do not contact one another to prevent uniform loading. One of the clamps 26 can then be positioned over the retainer 24 and tightened to hold the seal 22 and retainer 24 in position. The other clamp 26 can then be positioned over the retainer 24 and tightened. One of the clamps 26 is positioned on the retainer 24 near the second edge 46 and over the male manifold member 14 to ensure the interface between the female and male manifold members 12 and 14 is sealed. Once both clamps 26 are positioned, they are further tightened evenly to a predetermined tightness to allow for uniform loading. Once tightened, the seal clamp assembly 20 will be secured to the manifold. If over time the seal 22 requires retorqueing, for example if the seal 22 has lost mass, the clamps 26 can be further tightened thereby further tightening the flexible retainer 24 and the seal 22 to restore sealing performance.

The aforementioned systems, components, (e.g., clamps, retainers, manifolds, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

While the embodiments discussed herein have been related to the apparatus, systems and methods discussed above, these embodiments are intended to be exemplary and are not intended to limit the applicability of these embodiments to only those discussions set forth herein.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the invention has been described for purposes of illustrating the best mode known to the applicant at the time and enable one of ordinary skill in the art to practice the invention, including making and using devices or systems and performing incorporated methods. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A seal clamp assembly configured to seal female and male members together, the seal clamp assembly comprising:
    a seal configured to be positioned over the female and male members, the seal having a first end, a second end opposite the first end, a first edge, a second edge opposite the first edge, an area with a first thickness along its length at the first edge, and an area with a second thickness along its length at the second edge greater than the first thickness, the seal angling outwardly at the first and second edges; and
    a retainer configured to be positioned over the seal, the retainer having a first end, a second end opposite the first end, a first edge, a second edge opposite the first edge, and downwardly extending legs projecting downward from the first and second edges and being outwardly angled from the respective first and second edge, the downwardly extending legs being configured to be radially outwardly spaced from the first and second edges of the seal for axially retaining the seal, wherein the retainer has a serpentine configuration along its length.

2. The seal clamp assembly according to claim 1, wherein the second area of the seal is configured to abut the male member, the first area of the seal is configured to abut the female member, and a transition area between the first and second areas is configured to abut an end face of the female member.

3. The seal clamp assembly according to claim 1, wherein the seal includes a plurality of areas each with a thickness for abutting a respective area of a joint.

4. The seal clamp assembly according to claim 1, wherein the seal is a flexible and compressible seal comprising at least one of a ceramic fiber, mineral fiber, mica, flexible graphite, and vermiculite.

5. The seal clamp assembly according to claim 1, wherein the retainer includes upwardly extending projections projecting upward from the first and second edges for axially retaining clamps.

6. The seal clamp assembly according to claim 1, wherein the retainer includes a body having a plurality of horizontal portions longitudinally spaced from one another, the horizontal portions being connected to an adjacent one of the plurality of horizontal portions at one side thereof by one of a plurality of vertical portions.

7. The seal clamp assembly according to claim 6, wherein gaps are formed between the horizontal portions that alternately open to the first and second edges along the length of the retainer.

8. The seal clamp assembly according to claim 1, further comprising at least one clamp configured to be positioned over the retainer.

9. The seal clamp assembly according to claim 8, wherein the at least one clamp is a spring loaded clamp.

10. The seal clamp assembly according to claim 1, wherein the downwardly extending legs project downward and outwardly from a respective one of the upwardly extending projections.

11. A seal clamp assembly comprising:
a seal having a first end, a second end opposite the first end, a first edge, and a second edge opposite the first edge; and
a retainer configured to be positioned over the seal, the retainer having a first end, a second end opposite the first end, a first edge, and a second edge opposite the first edge, and the retainer including a plurality of horizontal portions longitudinally spaced from one another and being connected to an adjacent one of the plurality of horizontal portions at one side thereof by one of a plurality of vertical portions,
wherein the retainer includes upwardly extending projections projecting upward from the first and second edges for axially retaining clamps, and
wherein the retainer includes downwardly extending legs projecting downward and outwardly from a respective one of the upwardly extending projections for axially retaining the seal.

12. The seal clamp assembly according to claim 11, wherein the plurality of horizontal portions includes a first horizontal portion at the first end, a second horizontal portion at the second end, and a plurality of middle horizontal portions extending therebetween, and wherein each middle horizontal portion is connected on one side thereof to one of the plurality of vertical portions that extends away from the middle horizontal portion in a first longitudinal direction towards the first end and on another side thereof to one of the plurality of vertical portions that extends away from the middle horizontal portion in a second longitudinal direction towards the second end.

13. The seal clamp assembly according to claim 12, wherein gaps are formed between the middle horizontal portions that alternately open to the first and second edges along a length of the retainer.

14. The seal clamp assembly according to claim 11, wherein the seal has an area with a first thickness along its length at the first edge and an area with a second thickness along its length at the second edge greater than the first thickness, wherein the second area of the seal is configured to abut a male member, the first area of the seal is configured to abut a female member, and a transition area between the first and second areas is configured to abut an end face of the female member.

15. A seal clamp assembly configured to seal female and male members together, the seal clamp assembly comprising:
a seal configured to be positioned over the female and male members, the seal having a first end, a second end opposite the first end, a first edge, and a second edge opposite the first edge, and wherein the seal has an area with a first thickness along its length at the first edge and an area with a second thickness along its length at the second edge greater than the first thickness; and
a retainer configured to be positioned over the seal, the retainer having a first end, a second end opposite the first end, a first edge, and a second edge opposite the first edge, and the retainer including a plurality of horizontal portions longitudinally spaced from one another and being connected to an adjacent one of the plurality of horizontal portions at one side thereof by one of a plurality of vertical portions, upwardly extending projections projecting upward from the first and second edges for axially retaining clamps, and downwardly extending legs projecting downward and outwardly from a respective one of the upwardly extending projections for axially retaining the seal,
wherein the plurality of horizontal portions includes a first horizontal portion at the first end, a second horizontal portion at the second end, and a plurality of middle horizontal portions extending therebetween, and wherein each middle horizontal portion is connected on one side thereof to one of the plurality of vertical portions that extends away from the middle horizontal portion in a first longitudinal direction towards the first end and on another side thereof to one of the plurality of vertical portions that extends away from the middle horizontal portion in a second longitudinal direction towards the second end.

16. The seal clamp assembly according to claim 15, wherein the second area of the seal is configured to abut the male member, the first area of the seal is configured to abut the female member, and a transition area between the first and second areas is configured to abut an end face of the female member.

17. The seal clamp assembly according to claim 15, wherein the retainer includes upwardly extending projections projecting upward from the first and second edges for axially retaining clamps and downwardly extending legs projecting downward from the first and second edges for axially retaining the seal.

18. The seal clamp assembly according to claim 15, wherein the downwardly extending legs are radially outwardly spaced from the first and second edges of the seal for axially retaining the seal.

* * * * *